United States Patent
Knighton et al.

[11] Patent Number: 5,939,702
[45] Date of Patent: Aug. 17, 1999

[54] WRITING IMPLEMENT HAVING AN INTEGRATED OPTICAL READER

[75] Inventors: Mark S. Knighton, Santa Monica; David S. Agabra, Redondo Beach; David D. Drobnis, Venice; John M. Vernon, Malibu, all of Calif.

[73] Assignee: Motorola, Inc., Schaumburg, Ill.

[21] Appl. No.: 08/949,130

[22] Filed: Oct. 10, 1997

[51] Int. Cl.[6] ..................................................... G06K 7/10
[52] U.S. Cl. ........................... 235/472.03; 235/462.45; 235/472.02; 341/13; 401/195; 382/314; 345/179
[58] Field of Search .................. 235/472.01, 472.02, 235/472.03, 462.01, 462.25, 462.43, 462.44, 462.45, 462.46; 341/13; 401/195; 382/314; 345/166, 179

[56] References Cited

U.S. PATENT DOCUMENTS

| | | | |
|---|---|---|---|
| 3,004,140 | 10/1961 | Gomes | 362/579 |
| 4,202,641 | 5/1980 | Tomura | 401/32 |
| 4,475,240 | 10/1984 | Brogardh et al. | 382/59 |
| 4,748,318 | 5/1988 | Bearden et al. | 235/462.43 |
| 5,159,321 | 10/1992 | Masaki et al. | 345/179 |
| 5,247,137 | 9/1993 | Epperson | 178/19.04 |
| 5,247,170 | 9/1993 | Cardew | 235/472.03 |
| 5,434,371 | 7/1995 | Brooks | 178/19.04 |
| 5,517,579 | 5/1996 | Baron et al. | 382/187 |
| 5,652,412 | 7/1997 | Lazzounie et al. | 235/456 X |
| 5,774,602 | 6/1998 | Taguchi et al. | 382/341 |

FOREIGN PATENT DOCUMENTS 9116688  10/1991  WIPO .................................. 235/472

*Primary Examiner*—Donald Hajec
*Assistant Examiner*—Diane I. Lee
*Attorney, Agent, or Firm*—Jeffrey G. Toler; James E. Gauger

[57] ABSTRACT

A writing implement (10) has an optical reader (20) integrated therewith. The optical reader (20) can include a bar code reader, an optical text reader, or an optical imaging reader. Preferably, a wireless data communication circuit shares an emitter and a detector of the optical reader (20).

18 Claims, 3 Drawing Sheets

WRITING IMPLEMENT HAVING AN INTEGRATED OPTICAL READER

TECHNICAL FIELD

The present invention relates to optical readers including bar code readers.

BACKGROUND OF THE INVENTION

Many forms of handheld devices having an integrated optical data reader are presently available. These forms include a wand form, a gun form, a card form, and a handheld computer form.

Wand-shaped devices are typically sized and shaped like a cigar. An optical data reader such as a bar code reader is accessible at an end of the device. The wand-shaped device is held like a pencil for swiping the optical data reader across a printed code such as a bar code. Data read by the optical data reader is communicated from the wand-shaped device to a computer via either a wireline connection or a radio frequency interface.

Gun-type devices have a handle for holding like a gun. The device includes an optical data reader such as a scanning bar code reader. An end user aims the optical data reader toward a printed code. The optical data reader is activated and deactivated by a trigger proximate to the handle. Data read by a gun-type device is typically communicated to a computer via a wireline connection.

Examples of a card-shaped optical code readers are described in U.S. Pat. No. 4,721,849 to Davis et al. and U.S. Pat. No. 4,801,789 to Davis. U.S. Pat. No. 4,721,849 discloses a card-shaped reader having an input/output connector for interfacing with a host computer.

The handheld computer form has a bar code reader accessible at an end of a single housing. The single housing supports a keypad and a display in a manner similar to a handheld calculator.

BRIEF DESCRIPTION OF THE DRAWINGS

The invention is pointed out with particularity in the appended claims. However, other features of the invention are disclosed in the following detailed description and the accompanying drawings in which:

DETAILED DESCRIPTION OF A PREFERRED EMBODIMENT

Embodiments of the present invention provide an apparatus having an optical reader integrated with a writing implement. The apparatus advantageously has the form and function of a pen, pencil, or stylus. The form is amenable for carrying by an end user in a pocket, a briefcase, a purse, a daily planner, a portfolio, or a checkbook, for example. By carrying the apparatus for use in commonly-performed writing applications, the end user is further afforded the capability of reading optical data such as bar codes, printed text, and/or human-viewable images. The optical data can be subsequently downloaded to an external device such as a like apparatus, a computer, or a personal digital assistant. Preferably, the optical data is communicated by the same optoelectronic devices used to illuminate and/or read the data.

Figure 1:
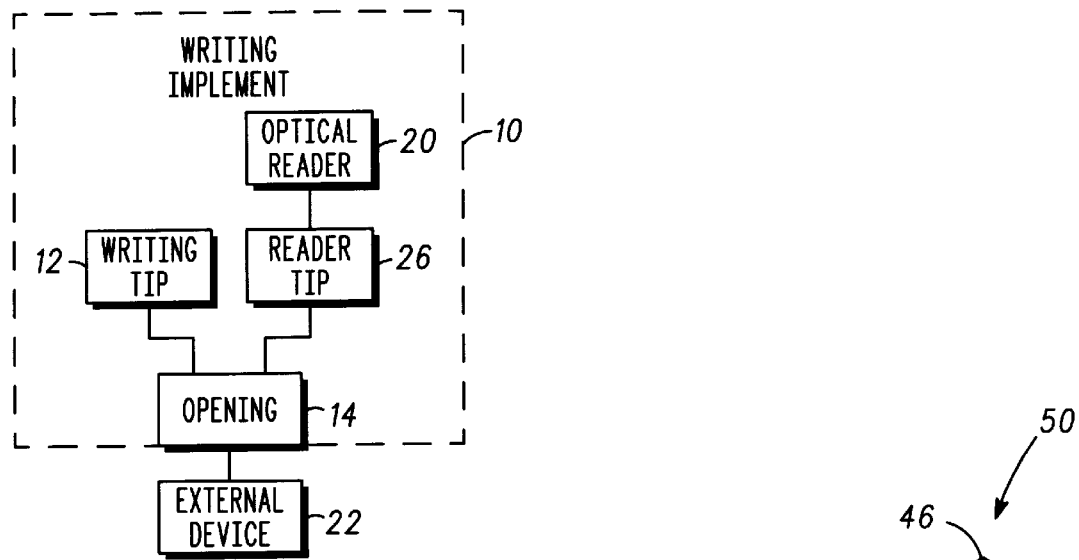
FIG. 1 is a block diagram of an apparatus in accordance with the present invention.

FIG. 1 is a block diagram of an apparatus in accordance with the present invention. The apparatus includes a writing implement 10. The writing implement 10 is sized and shaped to be handheld by an end user. Preferably, the writing implement 10 has an elongate form like that of a pen, a pencil, or a stylus.

The writing implement 10 has a writing tip 12 for applying a writing substance to a writing surface. Examples of writing substances include, but are not limited to, ink, graphite, clay, slate, and wax. Examples of writing surface materials include, but are not limited to, paper, plastic, glass, and metal.

The writing tip 12 is disposed at a writing end of the writing implement 10. The writing end is typically disposed at an end of the elongate form of the writing implement 10. Preferably, the writing tip 12 is accessible at the writing end when projected through an opening 14. In this case, it is preferred that the writing tip 12 be capable of assuming two positions: (i) the aforementioned forward position through the opening 14, and (ii) a retracted position wherein the writing tip 12 is retracted from the opening 14. When retracted, the writing tip 12 is inaccessible for writing. As an alternative, the writing tip 12 can be permanently disposed at the writing end to assume only a single position.

In a first preferred embodiment, the writing tip 12 includes either a ball point writing tip or a roller ball writing tip to transfer ink from a reservoir to the writing surface. In a second preferred embodiment, the writing tip 12 includes a fountain pen writing tip to transfer ink from a reservoir to the writing surface. In a third preferred embodiment, the writing tip 12 includes a soft tip such as a felt tip or a fiber tip to transfer ink from a reservoir to the writing surface. In a fourth preferred embodiment, the writing tip 12 includes a sleeve to hold a pencil lead to contact the writing surface. It is noted that other writing tips can be used in alternative embodiments of the apparatus.

Integrated with the writing implement 10 is an optical reader 20. The optical reader 20 reads optical data from an external device 22. The external device 22 can be either passive or active. An example of a passive external device includes a substrate such as paper or plastic having optical data in the form of printed data. The printed data can include a bar code, textual data, or graphical data, for example. Active external devices can include electrically-controllable light-emitting elements, light-absorbing elements, and/or light-reflecting elements to generate the optical data. Examples of active external devices include, but are not limited to, cathode ray tubes, light-emitting displays, liquid crystal displays, and other electrically-activated display devices.

The optical reader 20 can include an optical code reader such as a bar code reader to read a bar code from the external device 22. Alternatively, the optical reader 20 can include an optical text reader to read text from the external device 22. As another alternative, the optical reader 20 can include an optical imaging scanner to read and digitize text and graphics from the external device 22.

Dependent upon which types of optical data are to be read, the optical reader 20 can include a single optical detector or a plurality of optical detectors. The plurality of optical detectors can be arranged in a one-dimensional linear array, a two-dimensional array, or a nonlinear array, for example. Further, the optical reader 20 can include a single optical emitter or a plurality of optical emitters to illuminate the optical data. Alternatively, the optical reader 20 can be absent of an optical emitter in cases where additional illumination of the optical data is not required.

Preferably, a reader tip 26 communicates the optical data from the external device 22 to the optical code reader 20. The reader tip 26 acts as a light pipe to receive a first optical signal associated with the optical data from the external device 22. Preferably, the reader tip 26 communicates a second optical signal to illuminate the optical data. Illuminating the optical data assists in forming the first optical signal.

It is preferred that the reader tip 26 be accessible at the writing end of the writing implement 10. In this case, the reader tip 26 can be either permanently accessible at the writing end or can be selectively accessible at the writing end. Preferably, the reader tip 26 is accessible through the opening 14. In this case, it is further preferred that the reader tip 26 be accessible when the writing tip 12 is in a retracted position, and be inaccessible when the writing tip 12 is in a forward position. Alternatively, the reader tip 26 and the writing tip 12 can be simultaneously accessible.

As another alternative, the apparatus can assume three states: (i) a first state wherein the writing tip 12 is accessible and the reader tip 26 is inaccessible; (ii) a second state wherein the reader tip 26 is accessible and the writing tip 12 is inaccessible; and (iii) a third state wherein the writing tip 12 and the reader tip 26 are inaccessible. In this case, the state of the apparatus can be selected in a manner similar to a multipen writing instrument.

The apparatus advantageously provides both optical reading capabilities and writing capabilities in a single instrument. Although numerous embodiments can be contemplated, preferred embodiments of the apparatus are described with reference to FIGS. 2 to 4.

Figure 2:
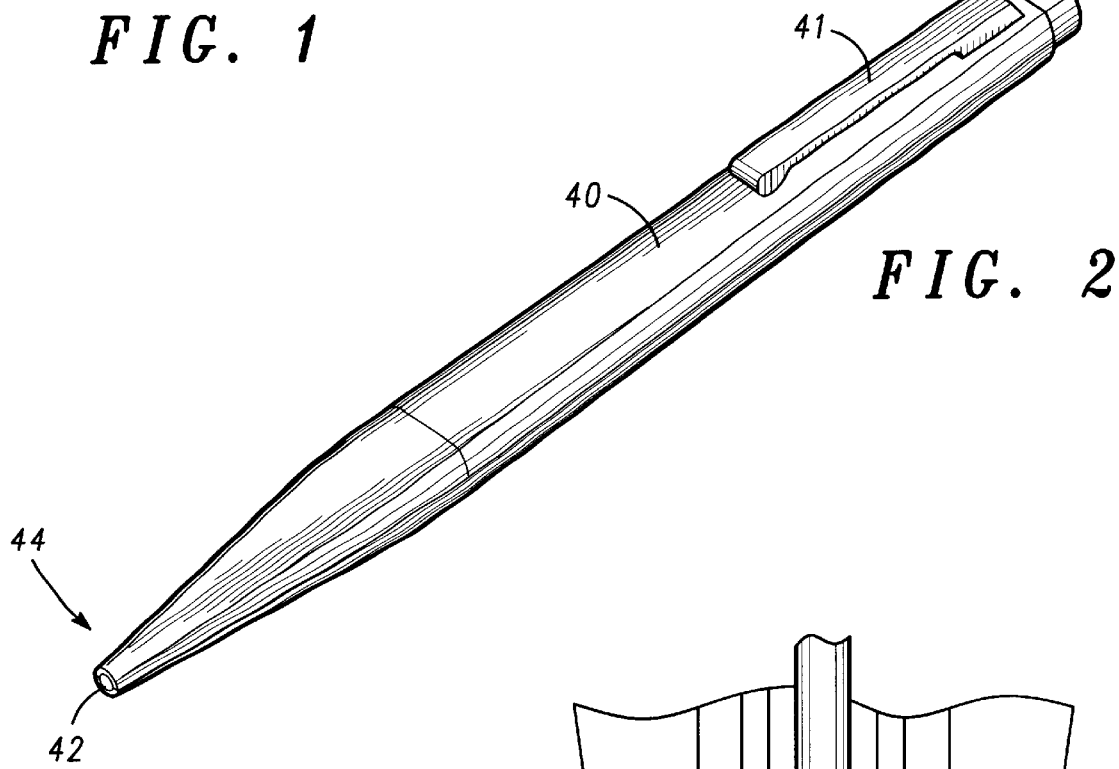
FIG. 2 is an external view of a preferred embodiment of an apparatus in accordance with the present invention.

FIG. 2 is an external view of a preferred embodiment of an apparatus in accordance with the present invention. The apparatus includes a housing 40. Preferably, the housing 40 is formed of plastic such as injection molded ABS/PC. It is noted, however, that the housing 40 can be formed of alternative materials using alternative processes.

The housing 40 has a handheld, elongate form similar to a pen, a pencil, or a stylus. Optionally, the housing 40 includes a clip 41 to clip the apparatus to an object such as a shirt pocket, a pen loop in a daily planner, portfolio, or briefcase, or other pen holders.

The housing 40 defines an opening 42 at a writing end 44. Through the opening 42, either a writing tip (not specifically illustrated) or a reader tip (not specifically illustrated) is made accessible. A member such as a button 46 is disposed at an opposite end 50 of the housing 40 to control which tip is accessible through the opening 42. A first click of the button 46 makes the writing tip accessible and deactivates an optical reader. A second click retracts the writing tip, provides the reader tip at the opening 42, and activates the optical reader.

Figure 3:
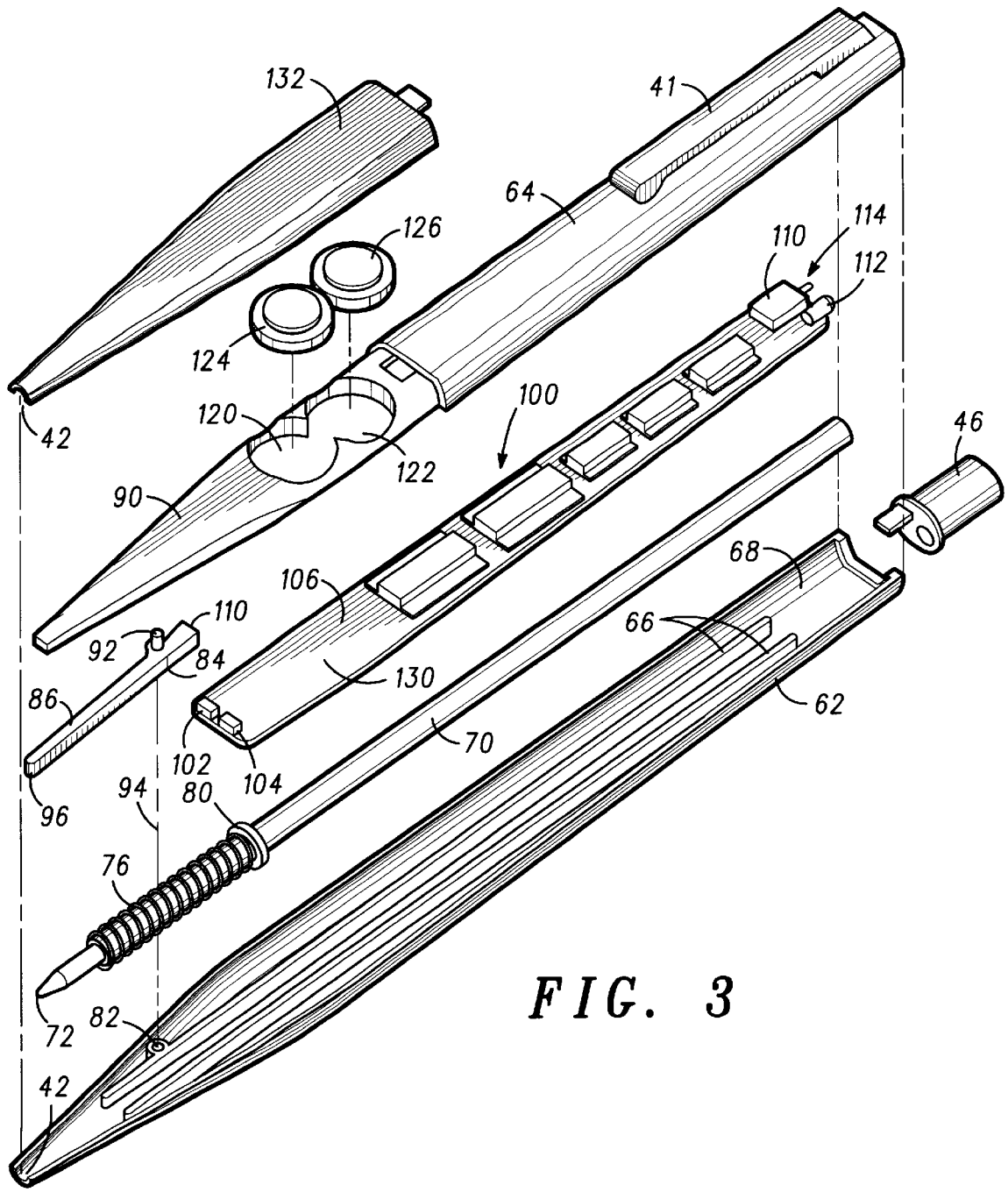
FIG. 3 is an exploded view of the embodiment of the apparatus of FIG. 2.

FIG. 3 is an exploded view of the embodiment of the apparatus of FIG. 2. The housing 40 is comprised of a first housing member 62 and a second housing member 64. The first housing member 62 and the second housing member 64 snap together in a clam shell manner to define opposite sides of the housing 40.

The first housing member 62 includes a cartridge-receiving guide 66 at an interior portion 68. The cartridge-receiving guide 66 receives and retains a writing cartridge 70. The writing cartridge 70 includes a writing tip 72 to deliver a writing substance, such as ink from a reservoir 74, to a writing surface. Preferably, the writing tip 72 includes a ball point writing tip or a roller ball writing tip.

The writing cartridge 70 further includes a spring 76 which coaxially surrounds a portion of the reservoir 74. The spring 76 is axially supported at an end 80 to retract the writing tip 72 from the opening 42 when commanded by the button 46. Preferably, the cartridge-receiving guide 66 is shaped and sized to retain a retractable ball point pen refill cartridge compatible with other pens (which may or may not have an optical reader).

The first housing member 62 includes a bearing 82 at the interior portion 68. The bearing 82 receives and retains a journal 84 of a light pipe 86. Although not specifically illustrated, the second housing member 64 includes a like bearing at an interior portion 90 to receive and retain a journal 92 of the light pipe 86. When retained by the bearings, the light pipe 86 is pivotable about an axis 94.

The light pipe 86 is spring-biased to pivot a reading tip 96 toward the opening 42 when the writing tip 72 is retracted. When the writing tip 72 is projected through the opening 42, a portion of the writing cartridge 70 urges the reading tip 96 away from the opening 42.

The light pipe 86 is formed of a transparent acrylic material to communicate optical signals between the opening 42 and an optical reader 100. The optical reader 100 includes an emitter 102 such as a light-emitting diode and a detector 104 such as a photodiode. The emitter 102 and the detector 104 are mounted adjacent one another on a circuit board 106. The light pipe 86 has a head 110 sized to simultaneously communicate with the emitter 102 and the detector 104. Preferably, the light pipe 86 is tapered from the head 110 to the reading tip 96.

The circuit board 106 supports one or more integrated circuits and/or other electronic components associated with the optical reader 100. The circuit board 106 supports a sensor such as a switch 110 associated with the button 46. The switch 110 senses a user-initiated depression of the button 46. The optical reader 100 is selectively activated and deactivated responsive to the switch 110.

The circuit board 106 further supports an indicator such as a light-emitting diode 112. The light-emitting diode 112 is capable of emitting either a single color or multiple colors of visible light to indicate the status of the optical reader 100. For example, the light-emitting diode 112 can indicate if the optical reader 100 is reading data, if the optical reader 100 has successfully read data, or if the optical reader 100 was unsuccessful in reading data. The status can be indicated by a continuous illumination, a pulsed illumination, or a color of illumination of the light-emitting diode 112.

Preferably, the button 46 includes a light-transmissive portion to view the light-emitting diode 112. In this case, the light-emitting diode 112 can be disposed adjacent the switch 110 at an end 114 of the circuit board 106. Preferably, the light-emitting diode 112 and the switch 110 are surface mounted to the circuit board 106.

The second housing member 64 defines a pair of battery-receiving locations 120 and 122. The locations 120 and 122 are sized to receive cells 124 and 126. Preferably, the cells 124 and 126 include coin cells such as CR2016 lithium coin cells. The cells 124 and 126 contact a portion 130 of the circuit board 106 supporting one or more battery contacts. The cells 124 and 126 power the optical reader 100 and other components supported by the circuit board 106.

The cells 124 and 126 are secured within the battery-receiving locations 120 and 122 by a battery cover 130. The battery cover 130 snaps onto the second housing member 64. Preferably, the battery cover 130 is formed of plastic, such as the injection-molded plastic used for housing 40.

Figure 4:
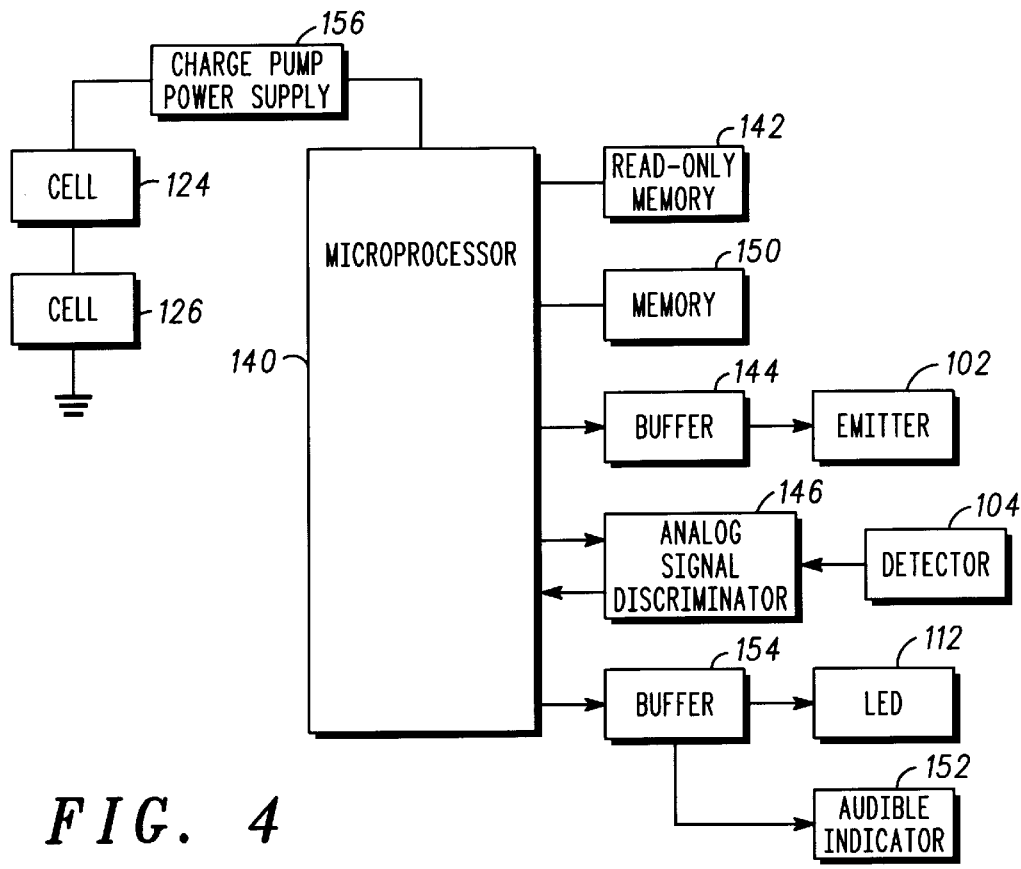
FIG. 4 is a block diagram of an embodiment of a circuit for use in the apparatus of FIG. 2.

FIG. 4 is a block diagram of an embodiment of a circuit supported by the circuit board 106. A microprocessor 140 directs the operation of the circuit in accordance with routines stored in a read-only memory 142. The read-only memory 142 includes a bar code driver routine and a data communication routine.

The emitter 102, which preferably includes an infrared light-emitting diode, is responsive to the microprocessor 140 via a buffer 144. The detector 104, which preferably includes an infrared photodiode, is coupled to the microprocessor 140 by an analog signal discriminator 146. Preferably, the emitter 102, the detector 104, the buffer 144, and the analog signal discriminator 146 are included in an IrDA (Infrared Data Association)-compliant transceiver. A preferred IrDA-compliant transceiver is available from Hewlett-Packard Corporation.

In accordance with the bar code driver routine, the microprocessor 140 drives the emitter 102 to illuminate a portion of a bar code. The microprocessor 140 reads data associated with a portion of the bar code from the detector 104. After reading the bar code, the microprocessor 140 decodes data encoded by the bar code. The microprocessor 140 stores either the encoded data or the decoded data in a memory 150. Preferably, the memory 150 includes a nonvolatile memory device such as an EEPROM to maintain the data in the absence of a powering signal.

In accordance with the data communication routine, the microprocessor 140 drives the emitter 102 to communicate data stored in the memory 150. Preferably, the data communication routine is compliant with an IrDA data communication protocol such as the 9600 baud IrDA protocol. As a result, data can be communicated with another like optical reading apparatus, or with other devices having an IrDA interface such as notebook computers, palmtop computers, and personal digital assistants.

Additionally in accordance with the data communication routine, the microprocessor 140 decodes data received by the detector 104. Preferably, the data is decoded in accordance with an IrDA protocol. The microprocessor 140 can store the data in the memory 150. The data can include data read from a like optical reading apparatus, or can encode a routine executable by the microprocessor 140 to provide additional functionality.

The microprocessor 140 is responsive to the switch 110 to activate and deactivate the optical code reading and data communication features of the circuit. One or more indicators, such as the light-emitting diode 112 and/or an optional audible indicator 152, are responsive to the microprocessor 140 via a buffer 154. The one or more indicators indicate the status of the circuit.

A charge pump power supply 156 regulates a series combination of the cells 124 and 126 to power the various components of the circuit. The charge pump power supply 156 includes a voltage regulator and other associated components.

Figure 5:
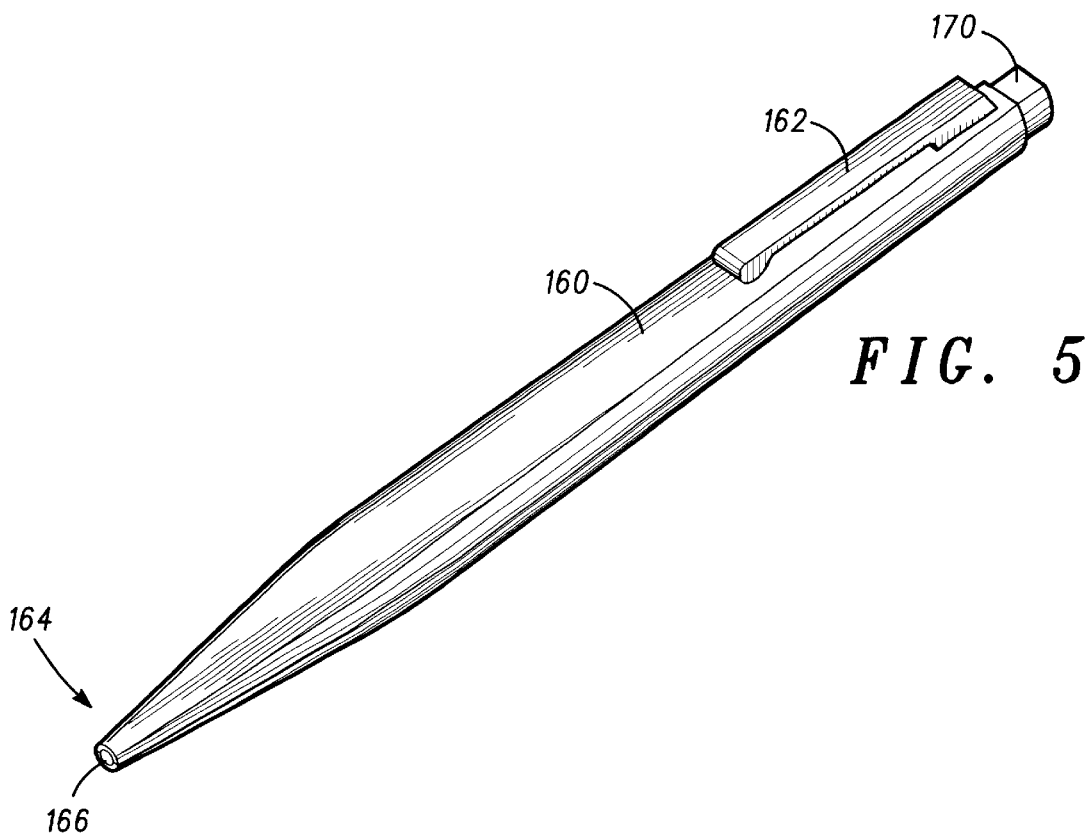
FIG. 5 is an exterior view of an alternative embodiment of an optical reading apparatus.

FIG. 5 is an exterior view of an alternative embodiment of an apparatus having a writing implement with an integrated optical reader. The apparatus includes a housing 160 having an elongate form similar to a pen, pencil, or stylus. The housing 160 supports a clip 162 to clip the apparatus to a shirt pocket and other objects.

The housing 160 defines an opening 164 through which a retractable writing tip 166 is accessed. The retractable writing tip 166 is projected through the opening 164 and retracted in response to user-initiated depressions of a button 170.

The optical code reader transmits and receives optical signals at locations around the opening 164. Preferably, the optical code reader transmits a first optical signal from a first side of the opening 164 and receives a second optical signal from a second side of the opening 164.

The apparatus can include similar circuitry as the embodiment described with reference to FIGS. 2 to 4 to read and store optical data, and to wirelessly communicate data with another device.

Figure 6:
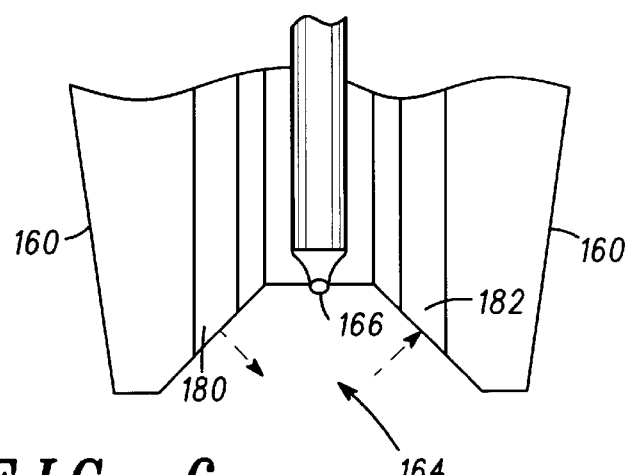
FIG. 6 is a cross sectional view of the writing end of the apparatus of FIG. 5.

FIG. 6 is a cross sectional view of the writing end of the apparatus of FIG. 5. A first light pipe 180 communicates optical signals from the emitter (not specifically illustrated) to the first side of the opening 164. A second light pipe 182 communicates optical signals from the second side of the opening 164 to the detector (not specifically illustrated).

The herein-described embodiments of the present invention can be used in a variety of optical reading applications. Of particular interest, however, are electronic network navigation applications such as those described in the copending application entitled "Electronic Network Navigation Device and Method for Linking to an Electronic Address Therewith", having Ser. No. 08/710,820, filed Sep. 23, 1996, which is hereby incorporated by reference into this disclosure.

Thus, there has been described herein several embodiments including preferred embodiments of a writing implement having an integrated optical reader.

Because the various embodiments of the present invention incorporate an optical reader with a writing implement, they provide a significant improvement in that optical data can be read using a commonly-carried instrument.

Additionally, the various embodiments of the present invention as herein-described communicate data with external devices using at least one optoelectronic device of the optical reader. By sharing the at least one optoelectronic device, the weight and price to provide both data communication and optical reading capabilities are reduced.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. An apparatus comprising:
    a writing implement having an opening through which a writing tip is projectable and through which an optical reader is accessible, the opening at a writing end of the writing implement;
    a member associated with the writing implement to select from a writing mode and an optical reading mode;
    an optical reader; and
    a light pipe to optically couple the optical reader to the writing end when the writing tip is retracted from the opening.

2. The apparatus of claim 1 further comprising a reader tip optically coupled to the optical reader, the reader tip accessible proximate to the opening.

3. The apparatus of claim 1 wherein the optical reader is accessible when the writing tip is retracted from the opening.

4. The apparatus of claim 1 wherein the optical reader is inaccessible when the writing tip is projected through the opening.

5. The apparatus of claim 1 wherein the light pipe is pivotally connected within the writing implement.

6. The apparatus of claim 5 wherein the light pipe is tapered between a head and a reader tip.

7. The apparatus of claim 5 wherein the light pipe is spring-biased toward a writing cartridge having the writing tip.

8. The apparatus of claim 5 wherein the light pipe pivots to a first position when the writing tip is projected through the opening.

9. The apparatus of claim 8 wherein the light pipe pivots to a second position when the writing tip is retracted from the opening.

10. The apparatus of claim 1 wherein the member is disposed at an end of the writing implement opposite to a writing end.

11. The apparatus of claim 1 further comprising a switch associated with the optical reader, the switch responsive to the member.

12. The apparatus of claim 11 wherein the member projects and retracts a writing tip.

13. The apparatus of claim 1 wherein the writing implement includes a housing, wherein at least a portion of the optical reader is supported by a circuit board, and wherein the circuit board is disposed between the housing and a writing cartridge.

14. The apparatus of claim 13 wherein the optical reader includes an emitter and a detector mounted to the circuit board.

15. The apparatus of claim 1 wherein the optical reader includes an emitter and a detector, the apparatus further comprising a wireless data communication circuit which shares the emitter and the detector.

16. The apparatus of claim 15 further comprising a memory to store data read by the optical reader, wherein the emitter communicates an optical signal associated with the data.

17. The apparatus of claim 1 wherein the optical reader includes at least one of a bar code reader, an optical text reader, and an optical imaging reader.

18. An apparatus comprising:

a writing implement to receive a writing cartridge having a writing tip, the writing implement having an opening through which the writing tip is projectable, the opening at a writing end of the writing implement;

a member associated with the writing implement to selectively project and retract the writing tip through the opening;

an optical reader integrated with the writing implement; and a light pipe spring-biased toward the writing cartridge to optically couple the optical reader to the writing end when the writing tip is retracted from the opening.

* * * * *